United States Patent
Aguilar et al.

(10) Patent No.: US 11,710,236 B1
(45) Date of Patent: Jul. 25, 2023

(54) VARIABLE EXPOSURE PORTABLE PERFUSION MONITOR

(71) Applicant: The Regents of the University of California, Oakland, CA (US)

(72) Inventors: Guillermo Aguilar, College Station, TX (US); Aditya Pandya, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 18/170,455

(22) Filed: Feb. 16, 2023

Related U.S. Application Data

(60) Provisional application No. 63/362,912, filed on Apr. 13, 2022.

(51) Int. Cl.
  *G06T 7/00* (2017.01)
  *G06V 10/62* (2022.01)
  *G06V 10/88* (2022.01)

(52) U.S. Cl.
  CPC ............ *G06T 7/0016* (2013.01); *G06V 10/62* (2022.01); *G06V 10/895* (2022.01); *G06T 2207/30104* (2013.01); *G06V 2201/07* (2022.01)

(58) Field of Classification Search
  CPC ........ G06T 7/0016; G06T 2207/30104; G06V 10/62; G06V 10/895; G06V 2201/07
  See application file for complete search history.

(56) References Cited

PUBLICATIONS

Hultman, M., Larsson, M., Strömberg, T. and Fredriksson, I., 2020. Real-time video-rate perfusion imaging using multi-exposure laser speckle contrast imaging and machine learning. Journal of Biomedical Optics, 25(11), pp. 116007-116007.*
Wang, C., Cao, Z., Jin, X., Lin, W., Zheng, Y., Zeng, B. and Xu, M., 2019. Robust quantitative single-exposure laser speckle imaging with true flow speckle contrast in the temporal and spatial domains. Biomedical Optics Express, 10(8), pp. 4097-4114.*
Wang, J., Wang, Y., Li, B., Feng, D., Lu, J., Luo, Q. and Li, P., 2013. Dual-wavelength laser speckle imaging to simultaneously access blood flow, blood volume, and oxygenation using a color CCD camera. Optics letters, 38(18), pp. 3690-3692.*
A. T. Culliford IV, J. Spector, A. Blank, N. S. Karp, A. Kasabian, and J. P. Levine, "The fate of lower extremities with failed free flaps: A single institution's experience over 25 years," Ann. Plast. Surg., 2007, doi: 10.1097/01.sap.0000262740.34106.1b.
Americal Society of Plastic Surgeons, "Plastic Surgery Statistics Report," 2019. [Online]. Available: https://www.plasticsurgery.org/documents/News/Statistics/2019/plastic-surgery-statistics-full-report-2019.pdf.

(Continued)

*Primary Examiner* — Zhitong Chen
(74) *Attorney, Agent, or Firm* — Perkins Coie LLP

(57) ABSTRACT

A method of imaging a target includes acquiring, by a processor of an imaging apparatus, multiple images of the target, wherein the multiple images have different exposure values; determining temporal and/or spatial variances for images with different exposure values; and generating a perfusion image of the target using results of the determining operation.

20 Claims, 13 Drawing Sheets

(56) References Cited

PUBLICATIONS

B. Lertsakdadet, C. Dunn, A. Bahani, C. Crouzet, and B. Choi, "Handheld motion stabilized laser speckle imaging," Biomed. Opt. Express, vol. 10, No. 10, p. 5149, 2019, doi: 10.1364/boe.10.005149.

B. P. Welford, "Note on a Method for Calculating Corrected Sums of Squares and Products," Technometrics, vol. 4, No. 3, pp. 419-420, 1962, doi: 10.1080/00401706.1962.10490022.

D. W. Grant, A. Mlodinow, J. P. Ver Halen, and J. Y. S. Kim, "Catastrophic Outcomes in Free Tissue Transfer: A Six-Year Review of the NSQIP Database," Plast. Surg. Int., 2014, doi: 10.1155/2014/704206.

H. Chen, P. Miao, B. Bo, Y. Li, and S. Tong, "A prototype system of portable laser speckle imager based on embedded graphics processing unit platform," Proc. Annu. Int. Conf. IEEE Eng. Med. Biol. Soc. EMBS, pp. 3919-3922, 2019.

I. Fredriksson, M. Hultman, T. Strömberg, and M. Larsson, "Machine learning in multiexposure laser speckle contrast imaging can replace conventional laser Doppler flowmetry," J. Biomed. Opt., 2019, doi: 10.1117/1.jbo.24.1.016001.

J. M. Smit et al., "Intraoperative evaluation of perfusion in free flap surgery: A systematic review and meta-analysis.," Microsurgery, vol. 38, No. 7, pp. 804-818, Oct. 2018, doi: 10.1002/micr.30320.

J. O'Doherty, P. McNamara, N. T. Clancy, J. G. Enfield, and M. J. Leahy, "Comparison of instruments for investigation of microcirculatory blood flow and red blood cell concentration," J. Biomed. Opt., vol. 14, No. 3, p. 034025, 2009, doi: 10.1117/1.3149863.

K. F. Ma, et al., "A systematic review of diagnostic techniques to determine tissue perfusion in patients with peripheral arterial disease," Expert Rev. Med. Devices, vol. 16, No. 8, pp. 697-710, 2019, doi: 10.1080/17434440.2019.1644166.

K. G. Bennett, J. Qi, H. M. Kim, J. B. Hamill, A. L. Pusic, and E. G. Wilkins, "Comparison of 2-Year Complication Rates among Common Techniques for Postmastectomy Breast Reconstruction," JAMA Surg., 2018, doi: 10.1001/jamasurg.2018.1687.

M. Hultman, I. Fredriksson, M. Larsson, A. Alvandpour, and T. Strömberg, "A 15.6 frames per second 1-megapixel multiple exposure laser speckle contrast imaging setup," J. Biophotonics, 2018, doi: 10.1002/jbio.201700069.

M. Hultman, M. Larsson, T. Strömberg, and I. Fredriksson, "Real-time video-rate perfusion imaging using multi-exposure laser speckle contrast imaging and machine learning," J. Biomed. Opt., vol. 25, No. 11, 2020, doi: 10.1117/1.jbo.25.11.116007.

NVIDIA, "Vision Programming Interface—NVIDIA," 2021. https://docs.nvidia.com/vpi/index.html (accessed Dec. 1, 2021); first page provided.

P. Kong, H. Xu, R. Li, G. Huang, and W. Liu, "Laser Speckle Contrast Imaging Based on a Mobile Phone Camera," IEEE Access, vol. 9, pp. 76730-76737, 2021, doi: 10.1109/ACCESS.2021.3076799.

R. Farraro, O. Fathi, and B. Choi, "Handheld, point-of-care laser speckle imaging," J. Biomed. Opt., vol. 21, No. 9, p. 094001, 2016, doi: 10.1117/1.jbo.21.9.094001.

S. Ragol et al., "Static laser speckle contrast analysis for noninvasive burn diagnosis using a camera-phone imager," J. Biomed. Opt., vol. 20, No. 8, p. 086009, 2015, doi: 10.1117/1.jbo.20.8.086009.

W. Heeman, W. Steenbergen, G. M. van Dam, and E. C. Boerma, "Clinical applications of laser speckle contrast imaging: a review," J. Biomed. Opt., vol. 24, No. 08, p. 1, 2019, doi: 10.1117/1.jbo.24.8.080901.

X. Tang, N. Feng, X. Sun, P. Li, and Q. Luo, "Portable laser speckle perfusion imaging system based on digital signal processor," Rev. Sci. Instrum., vol. 81, No. 12, 2010, doi: 10.1063/1.3505118.

Y. Qian et al., "A systematic review and meta-analysis of free-style flaps: Risk analysis of complications," Plastic and Reconstructive Surgery—Global Open. 2018, doi: 10.1097/GOX.0000000000001651.

* cited by examiner

VARIABLE EXPOSURE PORTABLE PERFUSION MONITOR

CROSS-REFERENCE TO RELATED APPLICATIONS

This patent document claims the benefit of priority of U.S. Provisional Application 63/362,912, filed on Apr. 13, 2022, entitled "VARIABLE EXPOSURE PORTABLE PERFUSION MONITOR." The entire contents of the aforementioned provisional application are incorporated by reference herein.

STATEMENT REGARDING FEDERALLY SPONSORED RESEARCH

This invention was made with government support under Grant No. 1940992 awarded by National Science Foundation (NSF). The government has certain rights in the invention.

TECHNICAL FIELD

This patent document relates to medical image, and more specifically to perfusion imaging.

BACKGROUND

Laser speckle imaging (LSI) has been widely used to image blood flow in biomedical/clinical research.

SUMMARY

Disclosed are devices, systems and methods to acquire medical images of a target using laser speckle imaging (LSI).

In one example aspect a method of imaging a target is disclosed. The method includes acquiring, by a processor of an imaging apparatus, multiple images of the target, wherein the multiple images have different exposure values; determining temporal and/or spatial variances for images with different exposure values; and generating a perfusion image of the target using results of the determining operation.

In another aspect, a medical imaging apparatus is disclosed. The apparatus includes a processor and one or more cameras configured to capture multiple images of the target at different exposure times under control of the processor.

In another aspect, another apparatus includes multiple cameras configured to acquire images simultaneously, where the cameras can be a combination of monochrome and color cameras; and a processor configured to process the images.

These, and other, aspects are disclosed throughout the document.

DETAILED DESCRIPTION

Figure 1:
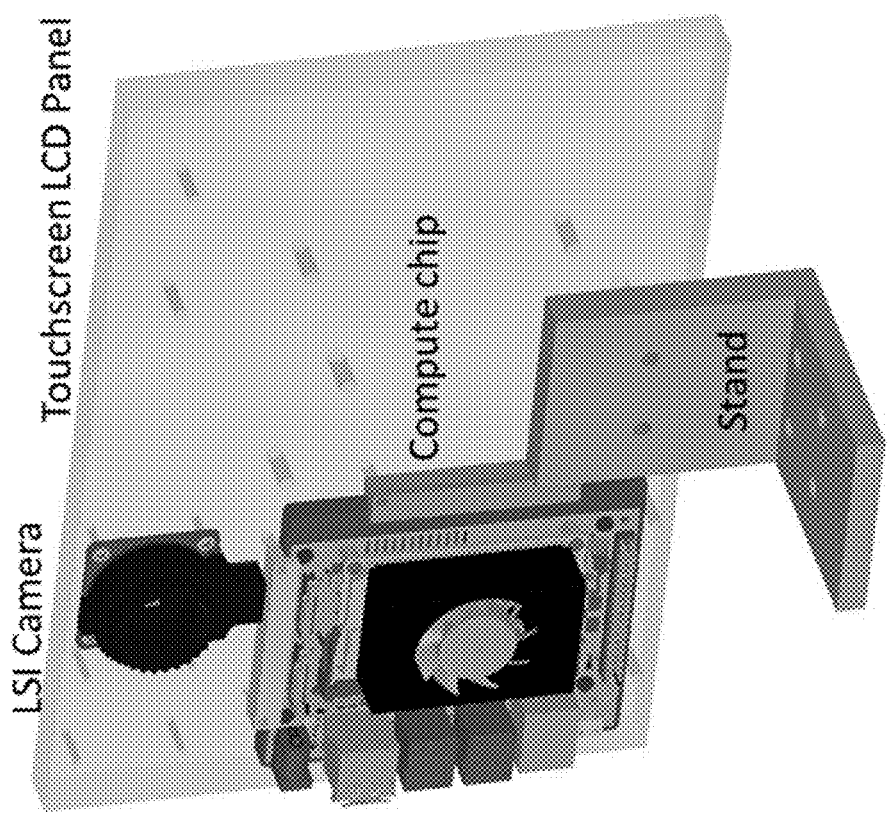
FIG. 1 depicts an example of an LSI imager prototype.

Section headings are used in the present document to improve readability and do not limit scope of disclosed techniques on a section-by-section basis.

Initial Discussion

Laser speckle imaging (LSI) has been widely used to image blood flow in biomedical/clinical research. Commercially available perfusion monitoring systems are bulky, expensive and lack portability. Portable devices that perform LSI using custom Digital Signal Processors (DSPs), and smartphones will be useful to perform single exposure LSI to monitor blood flow. While these can perform LSI, it is difficult to estimate flow rates using single exposure LSI. In the present document, the inventors have proposed net techniques to perform variable exposure LSI to evaluate flow rates in a 2D printed flow phantom. A described embodiment uses NVIDIA's Xavier NX embedded vision processing platform to perform variable exposure LSI to evaluate flow rates in a 3D printed flow phantom. A low-cost Raspberry Pi HQ camera was used to acquire LSI images and the increased sensitivity of the camera allowed images to be captured with exposure times <1 ms. The higher performance of the Xavier NX platform allowed for video-rate LSI imaging (25±2 frames per second, FPS, for spatial and 5±2 FPS for temporal variance images respectively) of the phantom and using variable exposure datasets, slow (2 mm/s-6 mm/s), medium (6 mm/s-12 mm/s), and fast (>12 mm/s) flow rates were distinguished. As further disclosed in the present document, the platform can extend the use of portable LSI devices in peri-operative, post-operative and other point-of-care applications as this platform can be commercialized into a tablet-like form factor for convenient portable operation.

INTRODUCTION

Analyzing tissue perfusion is a common task in many medical procedures and laboratory testing as it elucidates the viability of the tissue being examined. Monitoring these parameters is of clinical importance in wound healing, identifying ischemic occlusions, assessing success in reconstructive flap surgery and evaluating general microcirculation impairment that might be pronounced in patients with peripheral artery disease.

Reconstructive flap surgery is performed to repair traumatic wounds, congenital defects and post-oncological operative treatment (e.g., breast reconstruction after mastectomy, oral/head & neck reconstruction after tumor removal). These reconstructive procedures have been steadily rising in the past few decades. Most of these surgeries include autologous tissue reconstruction where a tissue flap is extracted from a certain part of the body and relocated to reconstruct the affected section. Ensuring the viability of this tissue flap is very important as it can lead to flap-failure due to inadequate blood perfusion resulting in partial or complete necrosis (tissue death) which is followed by expensive follow-up corrective surgery. Although these surgeries are quite successful, catastrophic outcomes (death or permanent disability) were found to be as high as 5% and long-term complication rates that might require additional surgery can be as high as 31%.

In one aspect, LSI is an imaging modality that allows monitoring the relative perfusion of the sample being examined. The speckle pattern generated due to the interference of monochromatic light incident on an object can be correlated to the motion of the object, as a static object generates a static speckle pattern and objects in motion generate a time-varying speckle pattern which can be leveraged to evaluate blood flow. Currently available commercial devices are too bulky, very expensive (>$50,000 USD) and provide qualitative information only. For use during surgery or post-operative monitoring, portable devices capable of monitoring perfusion are desired. Handheld laser speckle imaging has been extensively researched in the past decade. Devices using handheld charge coupled devices CCD or complementary metal oxide semiconductor CMOS cameras and gimbal stabilized CCD/CMOS cameras were designed to be used in point-of-care applications where data processing was performed on a regular personal computer PC/laptop. Complete systems that can perform data capture and perform processing at the same time were also designed using Digital Signal Processors (DSPs), embedded systems Field-programmable gate array (FPGA) systems and smartphones/mobile phones. Most of these systems that perform real-time imaging utilized single exposure LSI while the FPGA system described a variable/multi-exposure setup that can provide semi-quantitative results.

In one beneficial aspect, the disclosed embodiments leverage the computing capabilities of commercial vision processing system on modules (SOMs) to perform variable exposure LSI at video-rates. These devices facilitate the use of inexpensive Camera Serial Interface (CSI) cameras that can significantly reduce costs while providing real-time LSI images. Some embodiments use the variable exposure LSI performed on the NVIDIA SOM platform utilizing inexpensive cameras. Such a platform can allow for inexpensive handheld laser speckle imaging devices that can be used for intraoperative, perioperative and point-of-care applications.

EXAMPLE METHODS

In some embodiments, Xavier™ NX development kit (NVIDIA, USA) was used in combination with a Raspberry Pi™ HQ camera 12.3 MP (infrared, IR, filter removed) and a 6 mm CS lens (f/#1.4) kit (B0240 Arducam, USA). One advantage of using this development kit was the processing architecture that is optimized for processing video streams using specialized central processor unit CPU, graphics processor unit GPU, and dedicated vision processing hardware. A near-infrared NIR laser (DL808-7W0-O; CrystaLaser, USA) was used for oblique illumination (~45 deg) and the optical power ranged from 10 mW-30 mW.

FIG. 1 depicts the layout of the prototype, with an NIR camera and a touchscreen display with a custom user interface (UI) for displaying raw video streams and processed LSI streams. The overall dimensions of the prototype were similar to a 13-inch touchscreen laptop. In FIG. 1, stand provides mechanical stability and foundation to the touchscreen panel, the housing that holds the computer chip and other surrounding electronics (e.g., a fan, voltage regulators, etc.) and the camera. In one example implementation, a raspberry pi HQ camera (LSI camera) was attached to the computer chip (NVIDIA Xavier NX) using the CSI interface. A customized aluminum plate attached to a stand was used to hold the camera and computer chip behind the LCD panel.

In one example implementation, the NVIDIA jetson multimedia library was used to continuously acquire images from the CSI camera. Using a single threaded application, the images were then converted to vision programming interface (VPI) image formats and further processing was done using VPI Compute Unified Device Architecture (CUDA) backend. The CUDA processing pipeline enables fast realization of box filter for an unsigned 16-bit 1920×1080 image with a kernel size of 11×11 (to include multiple speckles within the window) with a benchmarked time of 0.171±0.001 ms. The interoperability between VPI and OpenCV allowed for quick computations using the OpenCV library to perform common image processing tasks. In some implementations, images were acquired as a continuous sequence at a constant laser power, which was repeated using different exposure times.

Spatial LSI Contrast Calculation

Using the NVIDIA vision programming interface and OpenCV libraries, approximate variance of a local neighborhood of 11×11 pixels was calculated using the following formula $$\sigma^2 = E[K^2] - E[K]^2 \quad (1)$$

Where E is the expected mean and K is the 11×11 kernel matrix from the image. In general, the kernel matrix can be any suitable dimension; the tradeoff being between available computing power and localization. The images were submitted to a CUDA processing stream created using VPI, and means were computed using the box filter algorithm from each separate image as described in Equation (1).

Temporal LSI Contrast Calculation

Figure 2A:
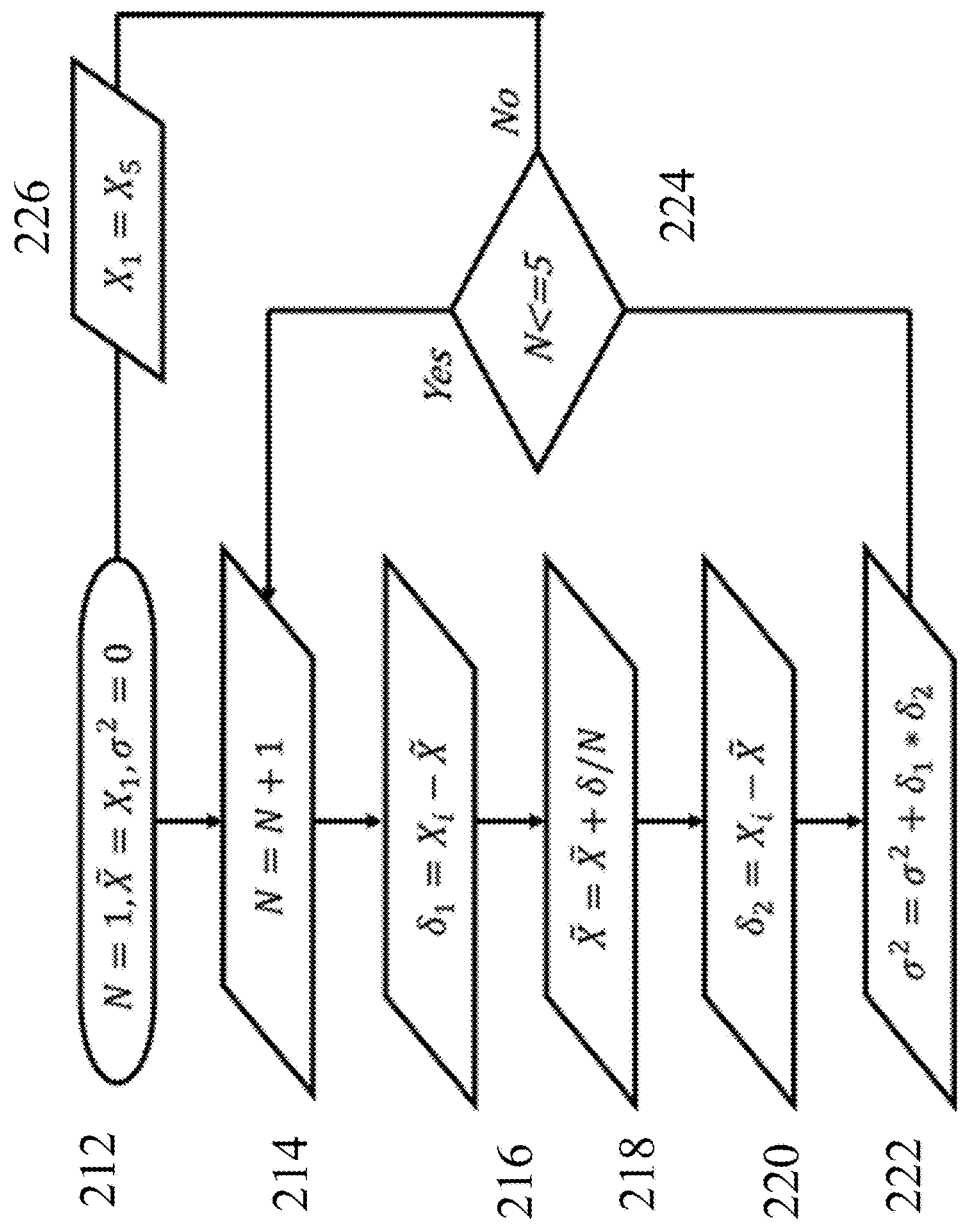
FIG. 2A and FIG. 2B depict flowcharts of an example of a variable exposure workflow.
Figure 2B:
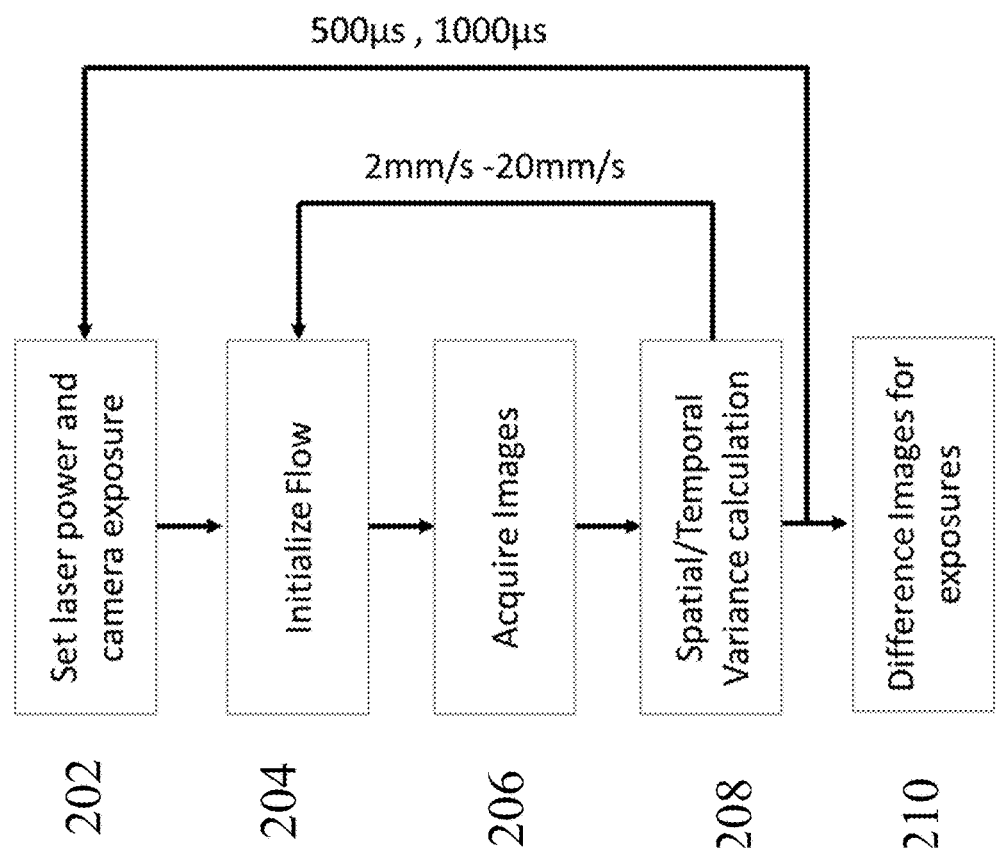

To achieve a fast calculation of variance, Welford's online algorithm was used to calculate variance for each pixel over 5 frames using the algorithm, e.g., as described in FIG. 2A and FIG. 2B.

FIG. 2A shows an example method for temporal variance calculation. In this method an initial pixel value $X_1$ was used for initialization (212) of aggregate mean X. The count N was updated (214) followed by computing $\delta_1$ as distance of the new sample from the previous mean (216). The mean value was updated to include the contribution of the new value (218) and $\delta_2$ was computed as the distance of the sample from the updated mean value (220). A variance sum was updated (222) to include the squared distance from the mean for both values for 5 consecutive frames (224). The iteration was iterated (226) over five frames, but in different embodiments, a different number of frames may be used.

Using the algorithm, in some embodiments, a mean value $\rho(x, y)_{T_O}$ at T=0 is initialized as $I_{T_O}(x, y)$, $I_{T_O}^{TEMP}(x, y)$ is initialized to $O_{xxy}$ and temporal variance images were computed for time $T_1$–$T_4$ as described in equation (2).

$$I_T^{TEMP}(x,y) = I_{T-1}^{TEMP}(x,y) + (I_T(x,y) - \rho(x,y)_{T-1})(I_T(x,y) - \rho(x,y)_T) \qquad (2)$$

Here $I_T^{TEMP}(x, y)$ is the temporal variance image which is updated for each time point from $T_1$-$T_4$. $\rho(x, y)_T$ and $\rho(x, y)_{T-1}$ are the current and previous mean estimates for the acquired images until time points T and T−1 respectively.

FIG. 2B shows a flowchart of an example workflow. At 202, laser power and camera exposure are set to a desired level, as described herein. At 204, a flow is initialized in a target sample. At 206, multiple images are acquired. In some embodiments, the acquired images may be acquired using multiple cameras. At 208, spatial/temporal variance calculations are performed, as further described in the present document. At 210, difference images for different exposures are evaluated, as described in the present document. The camera exposure operation 202 may be repeated for multiple exposure values. Similarly, the spatial/temporal variance calculations may be repeated over multiple time internals (e.g., 2 to 20 milliseconds).

Image Generation Examples

In some embodiments, a perfusion image may be generated by calculating differences of images in spatial and temporal variance images. For example, in some embodiments, a perfusion image may be generated according to the following equation:

$$I_{PERF} = \frac{\sum_{i=1}^{i=N-1} \left| I_{E_i}^{SPAT/TEMP} - I_{E_{i+1}}^{SPAT/TEMP} \right|}{N-1}, \qquad (3)$$

In the above equation, $I_{E_i}^{SPAT/TEMP}$ and $I_{E_{i+1}}^{SPAT/TEMP}$ are spatial or temporal variance images acquired at different exposure times $E_i$ and $E_{i+1}$ respectively and N is the total number of exposures collected. The set of exposures can be a linear sequence, non-linear sequence or randomized or selected pairs. Here, i is a positive integer index for iterating over exposure times. The term $I_{PERF}$ represents pixel values of the perfusion image at each pixel location (e.g., $I_{PERF}$ will be an array of values for the entire image). According to Eq. (4), the pixel value of a pixel of the perfusion image (e.g., luma intensity) is a sum of differences between spatial/temporal variance images of different exposure times. The exposure times can vary from 100 ns-1000 μs and at any increments. In some embodiments, the exposure times may be on a logarithmic scale—e.g., 100 nsec, 1000 nsec, 10,000 nsec and so on. In one beneficial aspect, use of exponentially related exposure times helps achieve a linear gradient with respect to the contrast introduced in perfusion images.

In some embodiments, the summation may be performed over each pair of exposure times, that is the value i may cover 1, 2, 3 . . . index difference among exposure values. In some embodiments, the summation may be limited to adjacent pairs of exposure times. For example, in the example described above, in one implementation, $I_{PERF}$ may be evaluated by differencing images for (100, 1000) nsec, and (1000, 10000) nsec pairs, while in some other embodiments, the differencing may be performed on each exposure pair (100, 1000), (100, 10000), (1000, 10000). In general, differencing over a greater number of exposure time differences may provide a more stable perfusion image that may eliminate visual anomalies in the acquired images, while differencing between adjacent exposure pairs may provide a more "true to the observation" image that may provide some additional clinical insights to a medical professional.

In some embodiments, a weighted average may be used.

$$I_{PERF} = \frac{\sum_{i=1}^{i=N-1} \left| w_{E_i} I_{E_i}^{SPAT/TEMP} - w_{E_{i+1}} I_{E_{i+1}}^{SPAT/TEMP} \right|}{N-1}, \qquad (4)$$

Here, weights $w_{E_i}$ and $w_{E_{i+1}}$, represent a relative weight given to each corresponding term, as further described herein. In some embodiments, the weights may be adjusted such that adjacent exposure pairs may get a first weight, while non-adjacent exposure numbers (e.g., 100 nsec and 10000 nsec, in the above example) may be assigned a second weight. In some embodiments, the relative values of the first weight and the second weight may be adjusted to provide a higher/lower contrast for certain flow regimes (e.g., low flow rate values may become more visible in the perfusion image when the first weight is higher than the second weight, while higher flow rates may become more visible when the second weight is higher than the first weight).

In some embodiments, the perfusion image that is generated using equation 4 or 5 is overlaid on top of a regular camera image. A color range of the perfusion image is scaled to the display image color range. In some embodiments, a threshold may be chosen for each imaging scenario based on the range of values in $I_{PERF}$ to define slow, medium and fast ranges. These ranges will then be displayed in varying colors and a color heatmap that identifies flow rates of target objects.

Imaging Phantom

Figure 3:
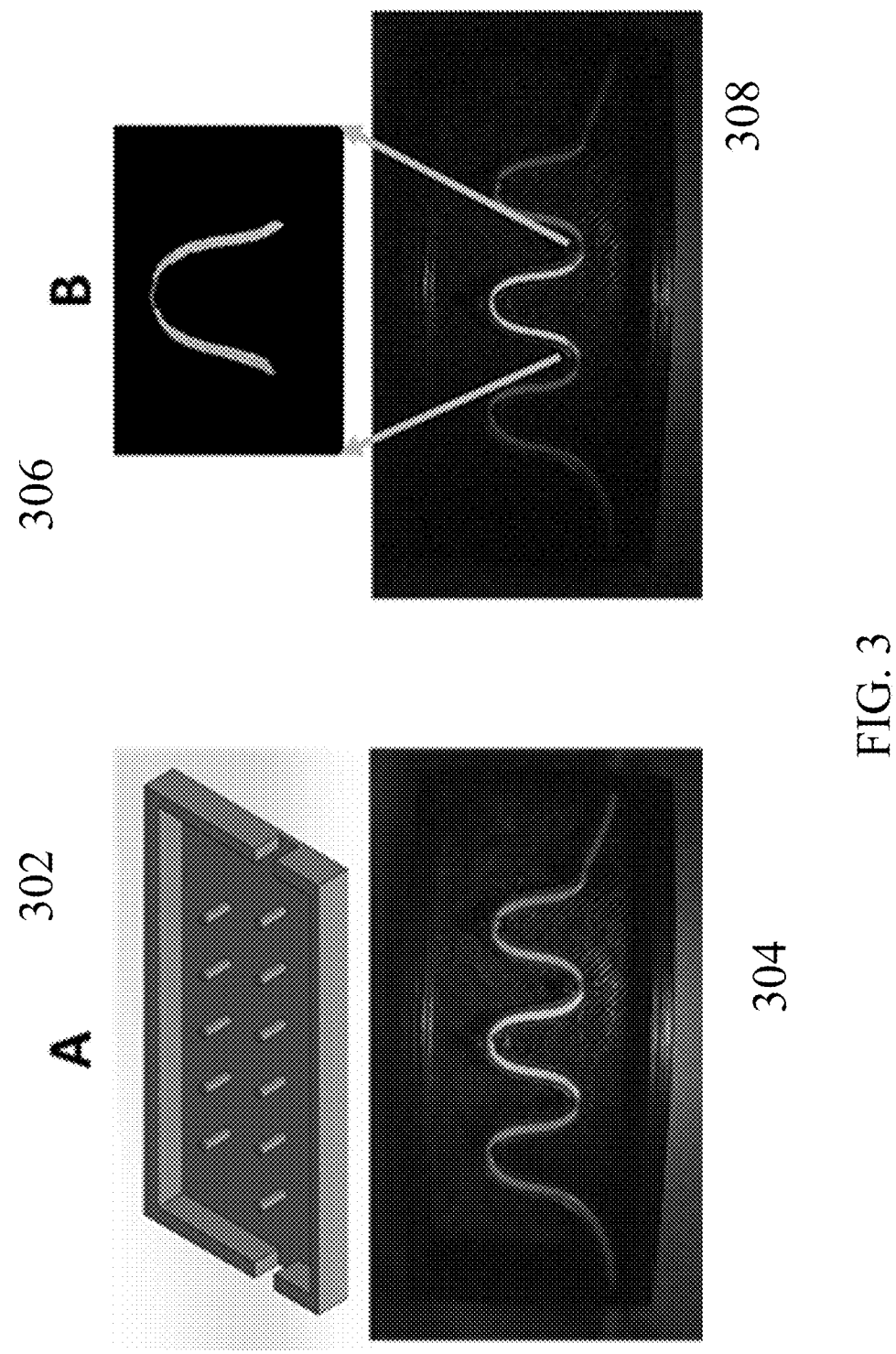
FIG. 3 depicts example of a 3D printed scaffold geometry, a sinusoidal plastic tubing, an isolated region of interest, ROI, and a mask displaying ROI.

A 3D printed scaffold as shown in FIG. 3, reference numerals 302, 304, was used to hold a Tygon™ clear plastic tubing with ID of 1/32" (0.8 mm). The pillars were spaced 1 cm apart and another row of pillars was offset by 0.5 cm to achieve a sinusoidal like pattern of tubing. 5% Intralipid solution was used as a flow medium and a syringe pump was used to create flow rates ranging from 2-20 mm/s with an interval of 2 mm/s. A central region was selected for analysis by manually creating a polygon mask in the central flow region of the plastic tube as shown in reference numerals 306 and 308. The selected ROI was used to calculate the average spatial and temporal variance from their corresponding images.

Benchmarking

NVIDIA profiler class was used to perform benchmarking on the image renderer to get an average FPS values. Performance was measured for 200 continuous frame acquisitions and max performance power profile was enabled for benchmarking.

Results and Discussion

Figure 4:
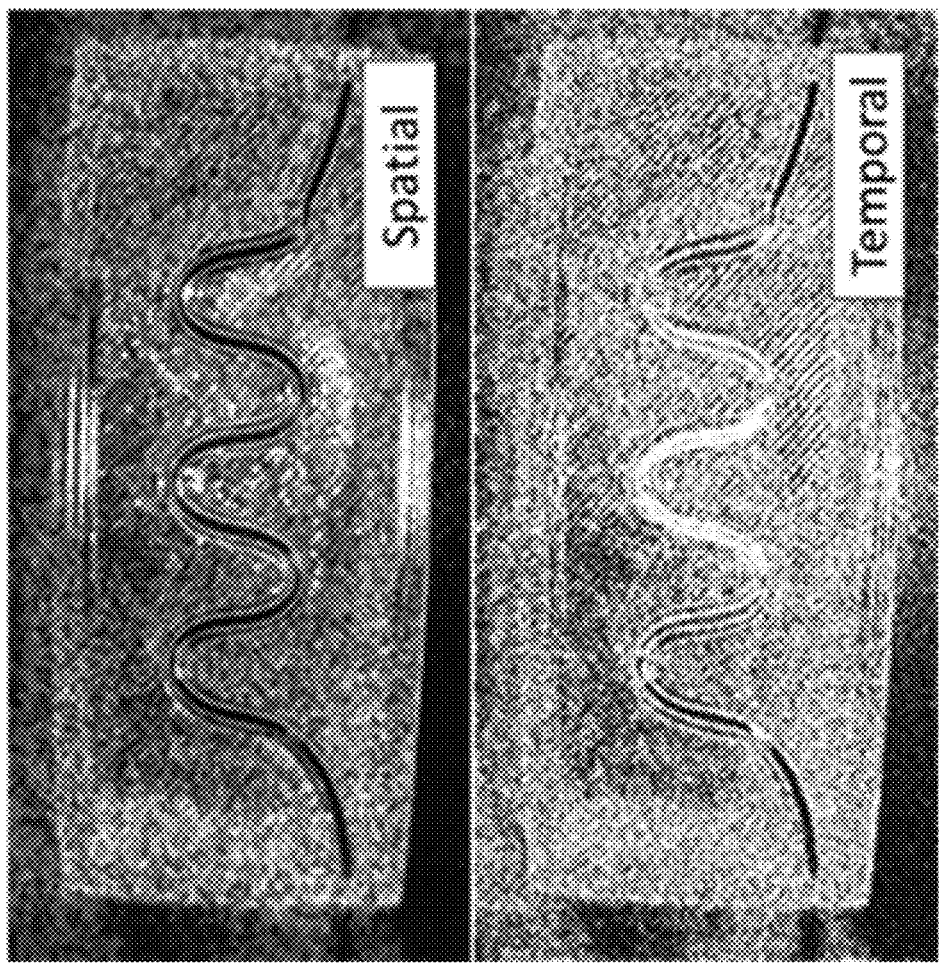
FIG. 4 shows examples of spatial and temporal images of the flow phantom. Brighter regions in the image correspond to a slow/static flow region and darker regions correspond to high flow regions. Regions closer to the edges of the image display darker regions due to shadows where laser illumination is absent

FIG. 4 depicts the real-time spatial and temporal images. Lens distortion was visible in the image (wide-angle lens) and the central sinusoidal channel exhibited the best focus region. In some cases, the focus region may be identified using image processing to detect distortion in a reference image due to lens and identifying region of least lens distortion or region having a measure of distortion below a threshold. The focus region was isolated and used for analysis to evaluate variance as a function of flow rate. In this particular example, temporal images displayed a better sensitivity to variation in flow compared to the spatial images, which can be attributed primarily to the better spatial resolution afforded by temporal processing of LSI images. In some implementations, spatial images were computed and rendered quicker (25±2 FPS) compared to temporal images (5±2 FPS).

Figure 5A:
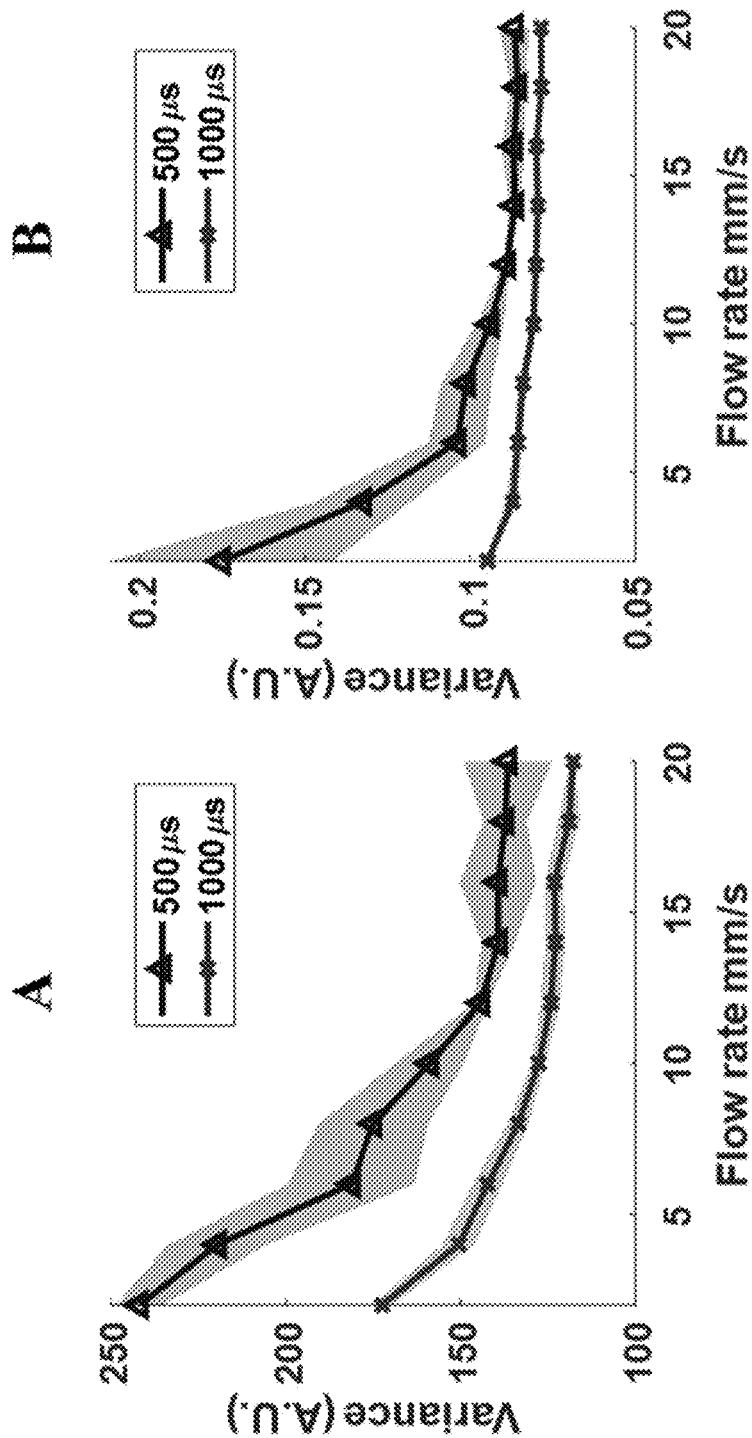
FIG. 5A is a graph depicting an examine of average variance within ROI plotted for (A) temporal and (B) spatial images, for two exposure times 500 μs and 1000 μs. Shaded regions represent+/−1 standard deviation.
Figure 5B:
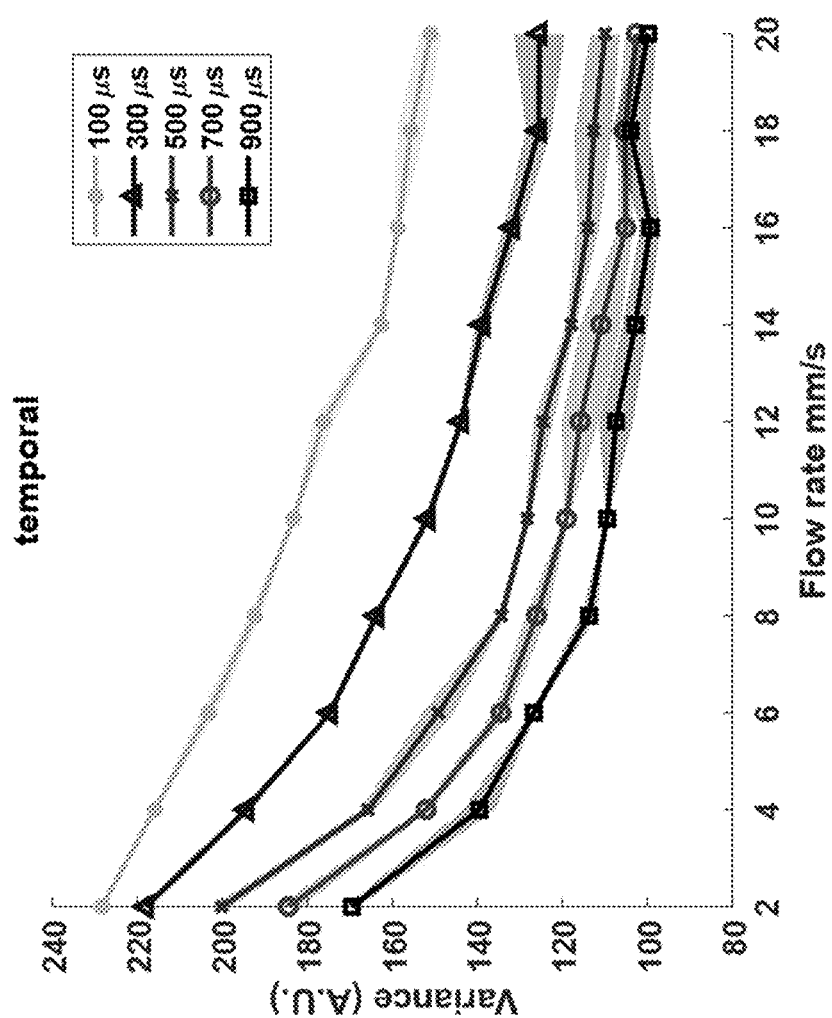
FIG. 5B depicts a graph of an example temporal speckle variance computed for flow rates ranging from 2-20 mm/s.
Figure 5C:
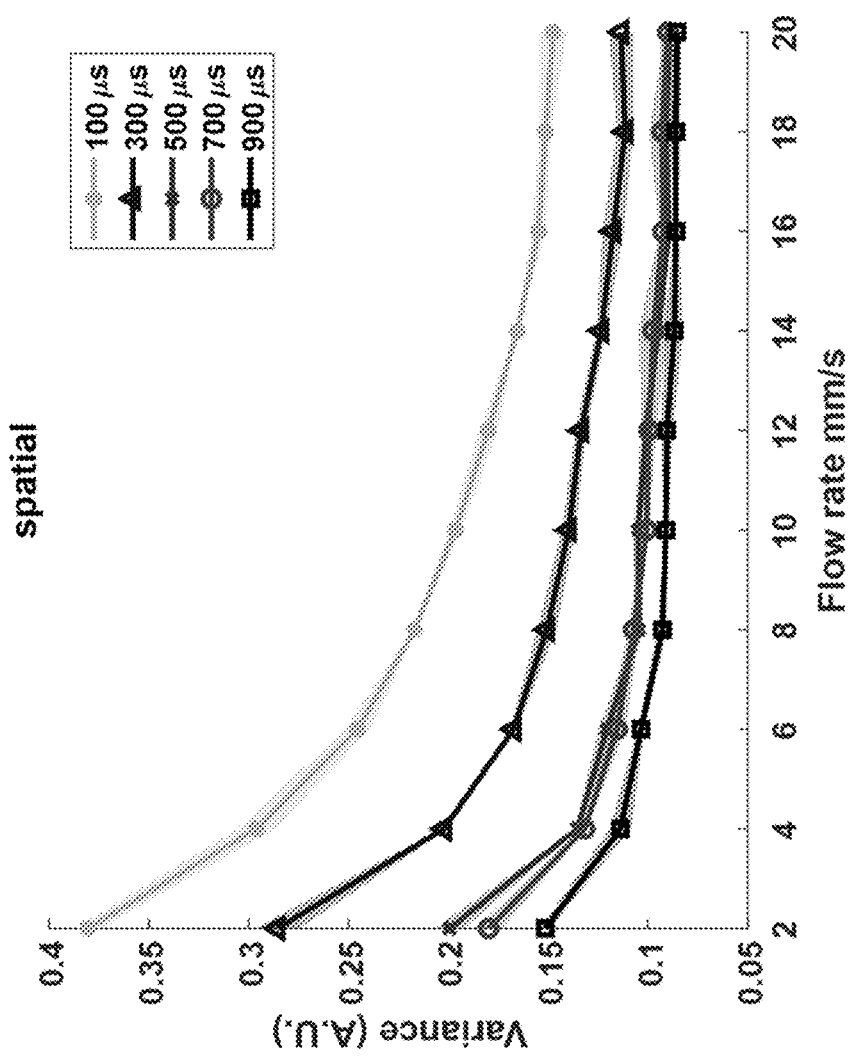
FIG. 5C depicts a graph of an example spatial speckle Variance computed for flow rates ranging from 2-20 mm/s.

An average value of variance for the defined ROI obtained from 3 independent trials and the corresponding variance is represented in FIG. 5A for temporal and spatial LSI. A decrease in variance can be observed as the flow rate increases for both spatial and temporal images. Temporal variance was more sensitive to flow changes while spatial variance rapidly reached a plateau for both exposure times. Although it is difficult to estimate exact flow parameters, by analyzing the difference in variance of two different exposures it can be possible to differentiate between flow regimes (slow (2 mm/s-6 mm/s), medium (6 mm/s-12 mm/s), and fast (>12 mm/s)). While more exposures can be utilized, it increases the computation time as curve fitting needs to be employed at each pixel, hence for this study 500 µs and 1000 µs exposure times were used. The short exposure times can also have an added benefit towards reducing motion artefacts. The temporal contrast was observed to be uniform throughout the selected region of interest while the spatial contrast showed variations due to fluctuations caused by spatial non-uniformities within the calculation kernel. For both temporal and spatial images, the difference in variance between the two exposure times reduces as flow rate increases, and this trend can be used to distinguish low flow rates from high flow rates in processed images.

Figure 6A:
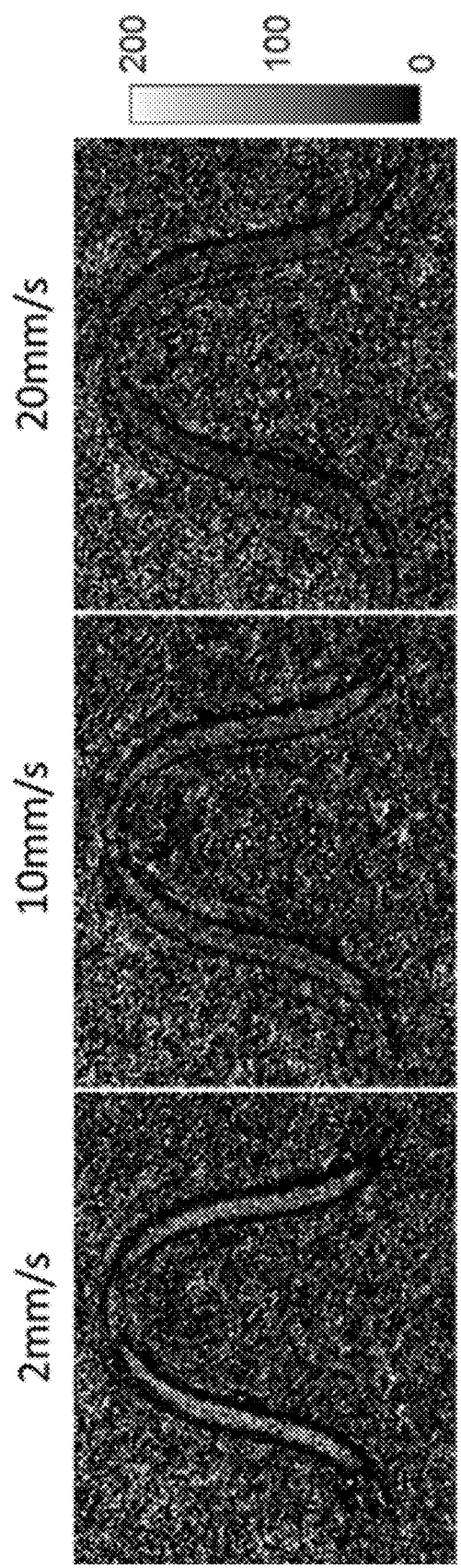
FIG. 6A shows an example of a difference images for selected flow rates showing variable exposure allows for differentiating flow regimes.
Figure 6B:
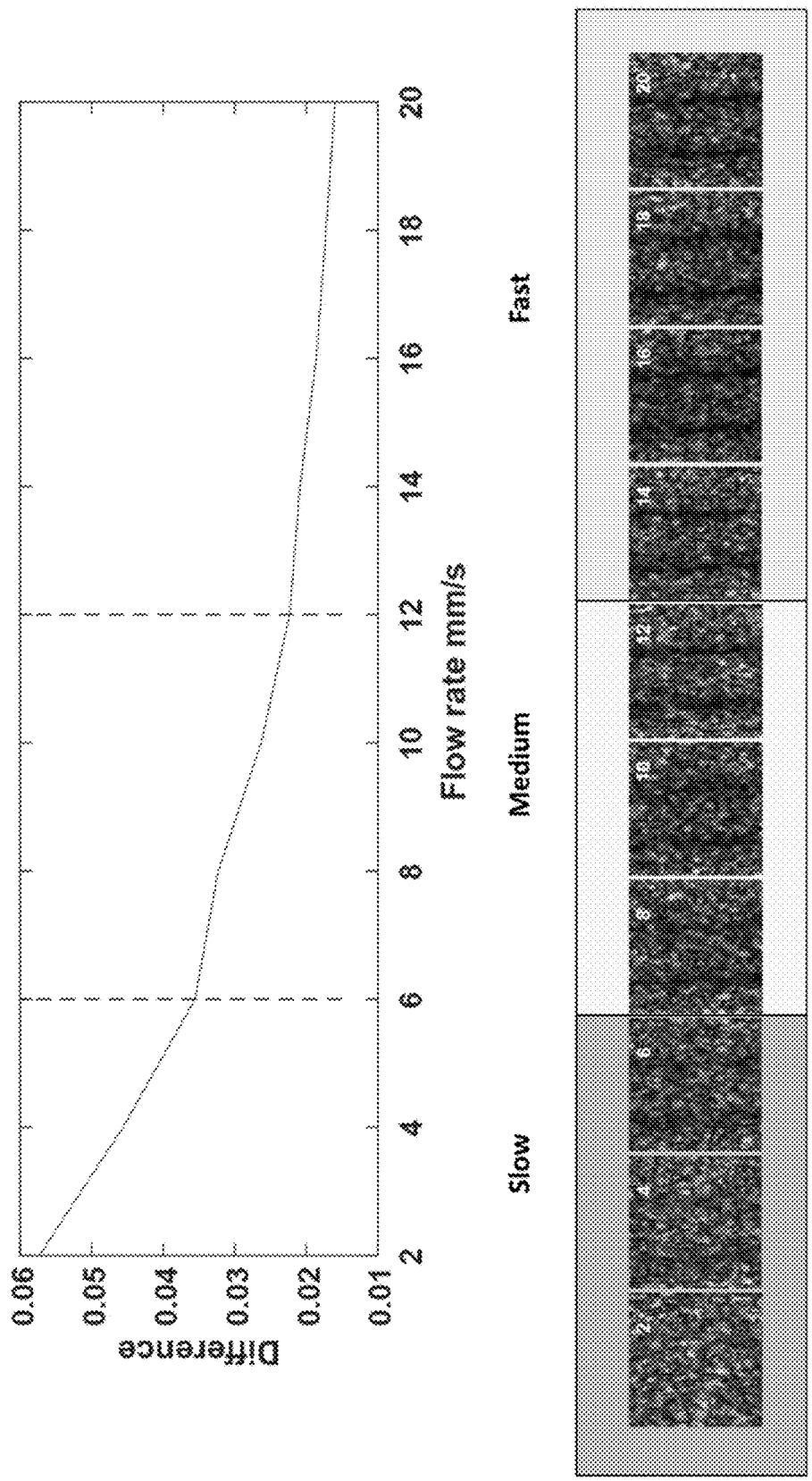
FIG. 6B shows examples of multi-exposure difference values for flow rates ranging from 2-20 mm/s. The top panel shows the average difference values of the speckle variance from the flow regions of the phantom. The bottom panel shows the absolute difference in images from different exposure times.

FIG. 6 depicts selected images obtained by computing the absolute difference between two exposure values for slow, medium, and fast flow rates for temporal LSI images. The slowest flow rate shows the largest difference while the largest flow rate depicted the least difference. The targeted flow regions in the phantom were visualized and separated from the background. A simple subtraction to demarcate flow regimes is desirable as it allows for reduced processing times making real-time flow rate imaging possible.

Final Comments

A portable, handheld video-rate LSI device capable of simultaneously providing spatial and temporal variance images was developed. A sustained rate of 25±2 FPS for spatial variance images and 5±2 FPS for temporal variance images was obtained using a single threaded application. Further optimizations such as multi-threading can improve the performance. Using variable exposure times (at least 2 different exposures), it was possible to differentiate flow regimes by observing difference in variance for each flow rate at two exposure times. The portable computing platform coupled with VPI libraries provided by NVIDIA was robust and efficient allowing for low-latency data processing that is important for real-time applications. While this study only evaluated a flow phantom without the presence of any static scattering elements or any motion artefacts, it demonstrated the efficacy of such a platform to be used as a portable LSI device. Further experiments are planned which include static scattering elements and a wavelength stabilized, temperature-controlled laser diode to improve the sensitivity of the device. While motion artefacts always plague LSI image processing, acquiring images at short exposure times (0.5 ms-1 ms) can reduce the effect of such artefacts. It was also observed that while being operated by a skilled user, motion artefacts can be partially mitigated. A systematic study of shorter exposure times and handheld motion artefacts is planned to understand and mitigate such artefacts.

The following listing of technical solutions may be preferably implemented by some embodiments.

Figure 7:
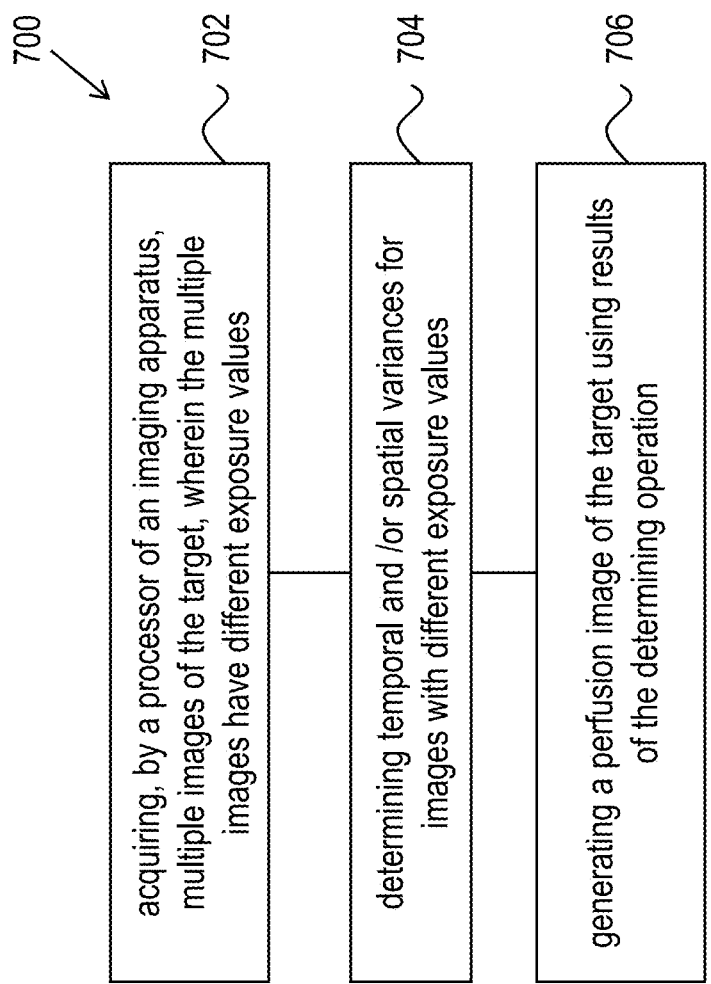
FIG. 7 is a flowchart of an example imaging method.

1. A method of imaging a target (e.g., method 700 depicted in FIG. 7), comprising: acquiring (702), by a processor of an imaging apparatus, multiple images of the target, wherein the multiple images have different exposure values; determining (704) temporal and/or spatial variances for images with different exposure values; and generating (706) a perfusion image of the target using results of the determining operation.

2. The method of solution 1, wherein the spatial variance is determined using a local neighborhood variance calculation.

3. The method of any of solutions 1-2, wherein the temporal variance is determined by computing variance of each pixel of the target over N frames, wherein N is a positive integer.

4. The method of solution 3, wherein N is greater than 1, and wherein the temporal variance is determined by storing a single frame in a memory, determining a contribution of the single frame to the temporal variance, and repeating the storing and the determination of the contribution over each of the N frames.

As disclosed in the present document, the generating the perfusion image comprises evaluating an average according to:

$$I_{PERF} = \frac{\sum_{i=1}^{i=N-1} \left| w_{E_i} I_{E_i}^{SPAT/TEMP} - w_{E_{i+1}} I_{E_{i+1}}^{SPAT/TEMP} \right|}{N-1},$$

where N is the total number of exposures collected, $I_{PERF}$ represents pixel value at each pixel location of the perfusion image, $I_{E_i}^{SPAT/TEMP}$ and $I_{E_{i+i}}^{SPAT/TEMP}$ represent spatial or temporal variances at corresponding pixel location for exposure times $E_i$ and $E_{i+i}$, $w_{E_i}$ and $w_{E_{i+i}}$ are real numbers representing a relative weight for each exposure.

Figure 9:
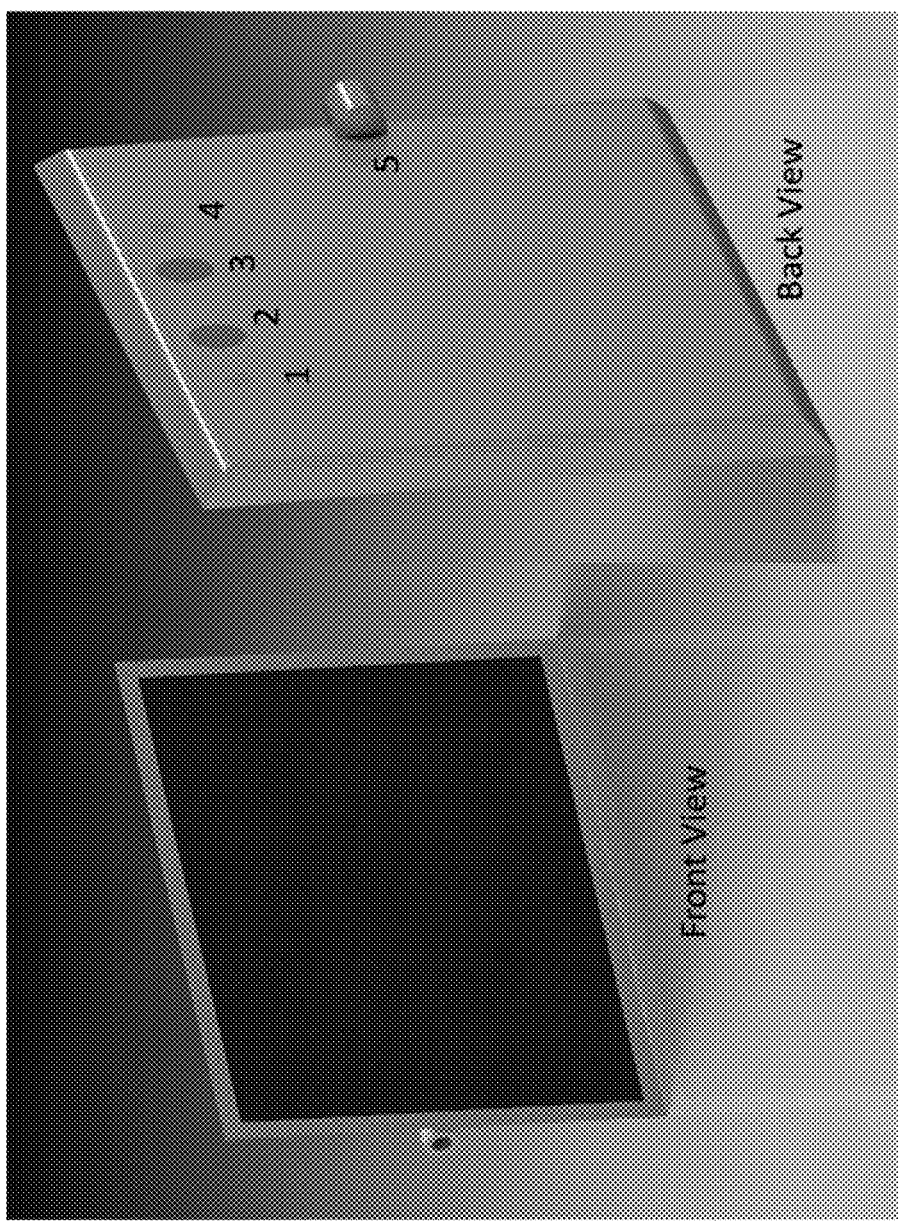
FIG. 9 shows an example embodiment of an imaging apparatus.

FIG. 9 shows an example of an imaging apparatus. The depicted example may be implemented in a form factor similar to a tablet device. The front display may act as a user interface used to control the operation of the imaging device. The back view shows a diffuse laser illumination port, an LSI camera, a normal camera, a multispectral LED illumination device and a mounting port that may be used to couple the imaging apparatus to other medical equipment.

Figure 8:
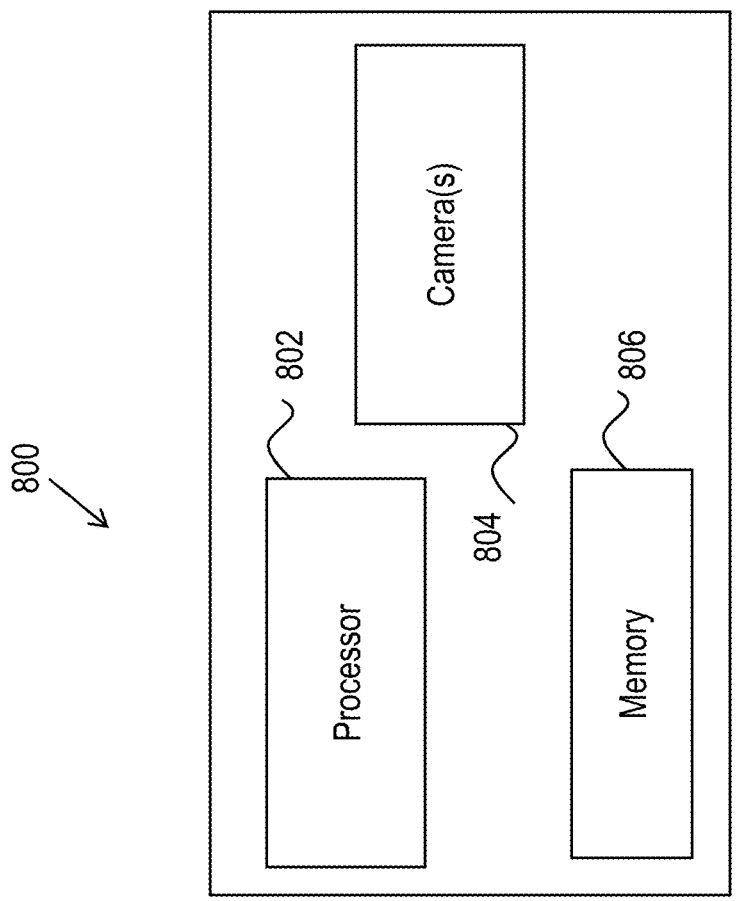
FIG. 8 is a block diagram of an example hardware platform used for implemented the disclosed techniques.

5. An apparatus (e.g., apparatus 800 in FIG. 8) comprising a processor 802 and one or more cameras 804, wherein the processor is configured to: control the one or more cameras to obtain multiple images at different exposure values; determine temporal and/or spatial variances for images with different exposure values; and generate a perfusion image of the target using results of the determining operation. The apparatus 800 may further include a memory 806 in which images and/or code may be stored.

6. The apparatus of solution 5, wherein the spatial variance is determined using a local neighborhood variance calculation.

7. The apparatus of any of solutions 5-6, wherein the temporal variance is determined by computing variance of each pixel of the target over N frames, wherein N is a positive integer.

8. The apparatus of solution 7, wherein N is greater than 1, and wherein the temporal variance is determined by storing a single frame in a memory, determining a contribution of the single frame to the temporal variance, and repeating the storing and the determination of the contribution over each of the N frames.

9. An apparatus, comprising: multiple cameras configured to acquire images simultaneously, where the cameras can be a combination of monochrome and color cameras; and a processor configured to process the images.

10. The apparatus of solution 9, wherein monochrome cameras have an intrinsic infrared filter that is removed, and a band-pass optical filter is added and configured to allow only the laser light to pass through while filtering all other wavelengths.

11. The apparatus of solutions 9-10, wherein the color cameras have a laser blocking filter attached to filter out the laser wavelength and allowing all other wavelengths to passthrough.

12. The apparatus of solutions 9-11, wherein the multiple cameras comprise a CCD/CMOS based image sensor with exposure times ranging from 0.1 ms-1 s and camera with higher near-infrared sensitivity.

13. The apparatus of any of solutions 9-12, wherein the cameras have optical image stabilization and are capable of variable focusing with different optical magnifications.

14. The method of any of solutions 9-13, wherein the multiple cameras have an optical magnification in the range of 0.5×-10×.

15. The apparatus of any of solutions 9-14, wherein at least some of the multiple cameras are capable of high frame rates with optimal FPS range in 10-1000

16. The apparatus of any of solutions 9-15, wherein at least some of the multiple cameras are capable of higher bit rates with 8 bits being minimum 12 bits preferred (range 8-16 bits per pixel)

17. The apparatus of any of solutions 9-16, wherein at least some of the multiple cameras are capable of Laser wavelength ranging from 400 nm-900 nm and the laser diode is mounted on an active or passive temperature-controlled mount.

18. The apparatus of any of solutions 9-17, further including an illumination device configured to illuminate using LED illumination wavelengths from 400-900 nm.

19. The apparatus of any of solutions 9-18, further including illumination arrangement ranges from a single laser diode and single light emitting diode LED to multiple laser diodes and multiple LEDs.

20. The apparatus of solution 19, wherein the illumination can be continuous or pulsed.

21. The apparatus of any of solutions 9-20, wherein the processor is configured to overlay normalized perfusion images onto the normal camera images.

It will be appreciated that the present document discloses a method of acquiring images simultaneously from multiple cameras where the cameras can be a combination of monochrome and color cameras.

In some embodiments, the monochrome cameras have an intrinsic infrared (IR) filter that is removed, and a band-pass optical filter is added to allow only the laser light to passthrough while filtering all other wavelengths.

In some embodiments, the color cameras have a laser blocking filter attached to filter out the laser wavelength and allowing all other wavelengths to passthrough.

In some embodiments, a charge coupled device or a complementary metal oxide semiconductor CCD/CMOS based image sensor with exposure times ranging from 0.1 ms-1 s and camera with higher near-infrared sensitivity may be used.

In some embodiments, the cameras have optical image stabilization and are capable of variable focusing with different optical magnifications. In some embodiments, the optical magnifications in the range of 0.5×-10×.

In some embodiments, the camera may be capable of high frame rates with optimal FPS range in 10-1000 (total range 1-10000).

In some embodiments, the camera may be capable of higher bit rates with 8 bits being minimum 12 bits preferred (range 8-16 bits per pixel).

In some embodiments, a laser wavelength ranging from 400 nm-900 nm and the laser diode is mounted on an active or passive temperature-controlled mount.

In some embodiments the LED illumination wavelengths may be from/to 400-900 nm.

In various embodiments, illumination arrangement ranges from a single laser diode and single LED to multiple laser diodes and multiple LEDs.

In various embodiments, illumination can be continuous or pulsed.

Some embodiments may include a step of overlaying normalized perfusion images onto the normal camera images.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of imaging a target, comprising:
   acquiring, by a processor of an imaging apparatus, multiple images of the target, wherein the multiple images have different exposure values;
   determining temporal variances for the multiple images, wherein the temporal variances are determined over pixel regions having predetermined dimensions over a pre-defined number of images over a period of time, and wherein the temporal variance of a given pixel region represents a difference between a square of mean square values of the pixels in the given pixel region over a pre-defined number of frames, N, where N is a positive integer, and a mean value of square values of the pixels over the pre-defined number of frames;

determining spatial variances for the multiple images, wherein the spatial variances are determined over the pixel regions having predetermined dimensions, and wherein a spatial variance of a given pixel region represents a difference between a mean value of squares of pixel values and a square of a mean value of pixels in the region; and generating a perfusion image of the target by combining the temporal variances and the spatial variances such that a local flow rate in the perfusion image at a given pixel is a function of changes in the spatial variances and the temporal variances as a function of exposure values;

wherein the generating the perfusion image comprises evaluating an average according to:

$$I_{PERF} = \frac{\sum_{i=1}^{i=N-1} \left| w_{E_i} I_{E_i}^{SPAT/TEMP} - w_{E_{i+1}} I_{E_{i+1}}^{SPAT/TEMP} \right|}{N-1},$$

wherein N is a total number of exposures collected, $I_{PERF}$ represents pixel value at each pixel location of the perfusion image, $I_{E_i}^{SPAT/TEMP}$ and $I_{E_{i+i}}^{SPAT/TEMP}$ represent spatial or temporal variances at corresponding pixel location for exposure times $E_i$ and $E_{i+i}$, $W_{E_i}$ and $W_{E_{i+i}}$ are real numbers representing a relative weight for each exposure.

2. The method of claim 1, wherein
the spatial variance is determined using a local neighborhood variance calculation; and
the temporal variance is determined by computing variance of each pixel of the target over the N frames, wherein N is a positive integer.

3. The method of claim 2, wherein N is greater than 1, and wherein the temporal variance is determined by storing a single frame in a memory, determining a contribution of the single frame to the temporal variance, and repeating the storing and the determination of the contribution over each of the N frames.

4. The method of claim 3, wherein images from different exposure values are combined by a difference operation and categorized based on the values resulting from the difference operation and are related to motion of the target being imaged.

5. An apparatus comprising a processor and one or more cameras,
wherein the processor is configured to:
control the one or more cameras to obtain multiple images of a target at different exposure values;
determine temporal variances for the multiple images, wherein the temporal variances are determined over pixel regions having predetermined dimensions over a pre-defined number of images over a period of time, and wherein the temporal variance of a given pixel region represents a difference between a square of mean square values of the pixels in the given pixel region over a pre-defined number of frames, N, where N is a positive integer, and a mean value of square values of the pixels over the pre-defined number of frames;
determine spatial variances for the multiple images, wherein the spatial variances are determined over the pixel regions having predetermined dimensions, and wherein a spatial variance of a given pixel region represents a difference between a mean value of squares of pixel values and a square of a mean value of pixels in the region;
generate a perfusion image of the target by combining the temporal variances and the spatial variances such that a local flow rate in the perfusion image at a given pixel is a function of changes in the spatial variances and the temporal variances as a function of exposure values;
wherein the generating the perfusion image comprises evaluating an average according to:

$$I_{PREF} = \sum_{i=1}^{i=N-1} \left| w_{E_i} I_{E_i}^{SPAT/TEMP} - w_{E_{i+1}} I_{E_{i+1}}^{SPAT/TEMP} \right|,$$

wherein N is a total number of exposures collected, $I_{PERF}$ represents pixel value at each pixel location of the perfusion image, $I_{E_i}^{SPAT/TEMP}$ and $I_{E_{i+i}}^{SPAT/TEMP}$ represent spatial or temporal variances at corresponding pixel location for exposure times $E_i$ and $E_{i+i}$, $W_{E_i}$ and $W_{E_{i+i}}$ are real numbers representing a relative weight for each exposure.

6. The apparatus of claim 5, wherein the spatial variance is determined using a local neighborhood variance calculation.

7. The apparatus of claim 5, wherein the temporal variance is determined by computing variance of each pixel of the target over N frames, wherein N is a positive integer.

8. The apparatus of claim 5, wherein N is greater than 1, and wherein the temporal variance is determined by storing a single frame in a memory, determining a contribution of the single frame to the temporal variance, and repeating the storing and the determination of the contribution over each of the N frames.

9. The apparatus of claim 8, wherein images from different exposure values are combined by a difference operation and categorized using resulting values and related to motion of the target under observation.

10. The apparatus of claim 5, wherein the one or more cameras include:
multiple cameras configured to acquire images simultaneously, where the cameras can be a combination of monochrome and color cameras; and
a processor configured to process the images.

11. The apparatus of claim 10, wherein monochrome cameras have an intrinsic infrared filter that is removed, and a band-pass optical filter is added and configured to allow only laser light to pass through while filtering all other wavelengths.

12. The apparatus of claim 10, wherein the color cameras have a laser blocking filter attached to filter out laser wavelength and allowing all other wavelengths to pass-through.

13. The apparatus of claim 10, wherein the multiple cameras comprise a CCD/CMOS based image sensor with exposure times ranging from 0.1 ms-1 s and camera with higher near-infrared sensitivity.

14. The apparatus of claim 10, wherein the cameras have optical image stabilization and are capable of variable focusing with different optical magnifications.

15. The apparatus of claim 10, wherein the multiple cameras have an optical magnification in a range of 0.5×-10×.

16. The apparatus of claim 10, wherein at least some of the multiple cameras configured to capture frames at frame rates in a range of 10-1000 frames per second.

17. The apparatus of claim 10, wherein at least some of the multiple cameras are configured to operate at 8 bits or greater resolution per pixel.

18. The apparatus of claim 10, wherein the processor is configured to overlay normalized perfusion images onto the camera images.

19. A non-transitory computer-readable medium having code stored thereon; the code, upon execution, causing a processor to implement a method comprising:
acquiring multiple images of a target, wherein the multiple images have different exposure values;
determining temporal variances for the multiple images, wherein the temporal variances are determined over pixel regions having predetermined dimensions over a pre-defined number of images over a period of time, and wherein the temporal variance of a given pixel region represents a difference between a square of mean square values of the pixels in the given pixel region over a pre-defined number of frames, N, where N is a positive integer, and a mean value of square values of the pixels over the pre-defined number of frames;
determining spatial variances for the multiple images, wherein the spatial variances are determined over the pixel regions having predetermined dimensions, and wherein a spatial variance of a given pixel region represents a difference between a mean value of squares of pixel values and a square of a mean value of pixels in the region; and
generating a perfusion image of the target by combining the temporal variances and the spatial variances such that a local flow rate in the perfusion image at a given pixel is a function of changes in the spatial variances and the temporal variances as a function of exposure values;
wherein the generating the perfusion image comprises evaluating an average according to:

$$I_{PERF} = \Sigma_{i=1}^{i=N-1} |W_{E_i} I_{E_i}^{SPAT/TEMP} - W_{E_{i+1}} I_{E_{i+1}}^{SPAT/TEMP}|/N-1,$$

wherein N is a total number of exposures collected, $I_{PERF}$ represents pixel value at each pixel location of the perfusion image, $I_{E_i}^{SPAT/TEMP}$ and $I_{E_{i+i}}^{SPAT/TEMP}$ represent spatial or temporal variances at corresponding pixel location for exposure times $E_i$ and $E_{i+i}$, $W_{E_i}$ and $W_{E_{i+i}}$ are real numbers representing a relative weight for each exposure.

20. The non-transitory computer-readable medium of claim 19, wherein the spatial variance is determined using a local neighborhood variance calculation; and
the temporal variance is determined by computing variance of each pixel of the target over the N frames, wherein N is a positive integer;
wherein N is greater than 1, and wherein the temporal variance is determined by storing a single frame in a memory, determining a contribution of the single frame to the temporal variance, and repeating the storing and the determination of the contribution over each of the N frames; and
wherein images from different exposure values are combined by a difference operation and categorized based on the values resulting from the difference operation and are related to motion of the target being imaged.

* * * * *